(12) United States Patent
Lee et al.

(10) Patent No.: US 8,926,019 B2
(45) Date of Patent: Jan. 6, 2015

(54) SEAT BACK LATCH FOR MOTOR VEHICLE

(75) Inventors: Jong-Chan Lee, Incheon (KR); Minyi Gil, Seoul (KR)

(73) Assignee: KM&I Co., Ltd., Incheon (KR)

( * ) Notice: Subject to any disclaimer, the term of this patent is extended or adjusted under 35 U.S.C. 154(b) by 126 days.

(21) Appl. No.: 13/591,748

(22) Filed: Aug. 22, 2012

(65) Prior Publication Data
US 2013/0049427 A1 Feb. 28, 2013

(30) Foreign Application Priority Data

Aug. 22, 2011 (KR) .................. 10-2011-0083416

(51) Int. Cl.
B60N 2/02 (2006.01)
B60N 2/48 (2006.01)
B60N 2/36 (2006.01)
B60N 2/22 (2006.01)

(52) U.S. Cl.
CPC ............. B60N 2/366 (2013.01); B60N 2/2245 (2013.01)
USPC .................... 297/378.13; 297/376; 297/463.1

(58) Field of Classification Search
USPC .................. 297/366, 463.1, 378.13, 354.12, 297/378.12, 335, 344.11, 376, 378.11
See application file for complete search history.

(56) References Cited

U.S. PATENT DOCUMENTS

| 5,158,338 | A * | 10/1992 | Hayakawa et al. ........... 297/335 |
| 6,733,078 | B1 * | 5/2004 | Zelmanov ................... 297/378.1 |
| 7,762,604 | B1 * | 7/2010 | Lindsay ........................... 296/64 |
| 7,819,478 | B2 * | 10/2010 | Griswold et al. ......... 297/378.13 |
| 7,954,898 | B2 * | 6/2011 | Van De Geer et al. ... 297/378.13 |
| 2012/0012166 | A1 * | 1/2012 | Atanackovic ................. 136/252 |
| 2012/0133188 | A1 * | 5/2012 | Wieclawski et al. ..... 297/378.13 |

FOREIGN PATENT DOCUMENTS

| JP | 2003-146126 | 5/2003 |
| JP | 2011-157685 | 8/2011 |

* cited by examiner

Primary Examiner — Chi Q Nguyen
(74) Attorney, Agent, or Firm — Finnegan, Henderson, Farabow, Garrett & Dunner, LLP

(57) ABSTRACT

Provided is a seat back latch for locking or unlocking a seat back of a motor vehicle seat in order to fold the seat back, and more particularly, a seat back latch for a motor vehicle capable of adjusting an inclination of a seat back in a multi-stage and firmly maintaining a locked state of the seat back.

4 Claims, 5 Drawing Sheets

SEAT BACK LATCH FOR MOTOR VEHICLE

CROSS-REFERENCE TO RELATED APPLICATIONS

This application claims priority under 35 U.S.C. §119 to Korean Patent Application No. 10-2011-0083416, filed on Aug. 22, 2011, in the Korean Intellectual Property Office, the disclosure of which is incorporated herein by reference in its entirety.

TECHNICAL FIELD

The following disclosure relates to a seat back latch for locking or unlocking a seat back of a motor vehicle seat in order to fold the seat back, and more particularly, to a seat back latch for a motor vehicle capable of adjusting an inclination of a seat back in a multi-stage and firmly maintaining a locked state of the seat back.

BACKGROUND

Generally, a seat for a motor vehicle, which is configured of a seat cushion and a seat back to maintain a boarding attitude of a passenger, is provided on a driver seat and a passenger seat and is divided into a separator type seat on which only one person may be seated and a bench type seat provided behind the driver seat and the passenger seat so that several persons may be simultaneously seated thereon.

The separator type seat provided at the driver seat and the passenger seat may be adjusted in accordance with a body type of a driver and a passenger so that the driver and the passenger may maintain an attitude appropriate for driving, and a seat back serving as a back support so that the passenger may take a rest is provided with a reclining apparatus adjusting an angle forward or backward.

The bench type seat provided at the rear of the motor vehicle is provided with a seat back latch allowing the seat back to be folded forward in order to mount a load having a large volume or a long length in a trunk. Recently, a technology of adjusting an inclination of the seat back to increase an amount of load without folding the seat back has been known.

In the seat back latch according to the related art shown in FIG. 1, when a lever 51 is pulled in an arrow direction C, a first link 52 rotates while being pulled, a second link 53 formed integrally with the first link 52 also rotates while forming a rotation trajectory as shown by an arrow B around a hinge 54, and a latch tooth 57 connected to the second link 53 and a pin 55 through a long hole 56 rotates according to a trajectory of an arrow A around a hinge axis 58, such that a striker 60 engaged with a tooth 59 of the latch tooth 57 is unlocked from the latch tooth 57, thereby making it possible to change a seat back support angle.

In addition, when a state in which the lever 51 is pulled is released, the latch tooth 57 and the first and second links 52 and 53 return to their original states by elastic force of a return spring 61, such that the striker 60 is again received and locked in the tooth 59.

In the seat back latch according to the related art, the striker 60 is locked to and supported by the tooth 59 of the latch tooth 57. However, a connection portion between the latch tooth 57 and the first and second links 52 and 53 is weak, such that a locking operation is unreliable and there is a risk that a state in which the striker 60 is locked will be arbitrarily released.

SUMMARY

An embodiment of the present invention is directed to providing a seat back latch capable of adjusting an inclination of a seat back by allowing a latch tooth having a single tooth to be locked to a striker kit including a plurality of strikers.

Another embodiment of the present invention is directed to providing a seat back latch in which a circumferential surface of a locking cam and an upper surface of a latch tooth surface-contact each other and the latch tooth is locked to or unlocked from a striker by rotation of the locking cap.

In one general aspect, a seat back latch for a motor vehicle includes: a striker kit fixed to a portion adjacent to a seat back in order to fold the seat back; and a latch kit provided in the seat back and locked to or unlocked from the striker kit, wherein the latch kit includes: a housing including a slit groove so that the striker kit is slid; a latch part including a tooth exposed to the slit groove by downward movement to lock the striker kit; an elastic part providing elastic force so as to maintain a state in which the latch part moves upwardly to maintain a state in which the tooth is unlocked from the striker kit; and a locking part overcoming the elastic force of the elastic part by a lever to lock the tooth to the striker kit by the downward movement of the latch part, and wherein the striker kit includes a plurality of strikers spaced apart from each other by a predetermined distance, and an inclination of the seat back is adjusted when the latch part is locked to each of the plurality of strikers.

The tooth may have a width that becomes narrower toward an upward direction.

The locking part may include a locking cam rotating by vertical movement of the lever, and the tooth of the latch part may move vertically by the rotation of the locking cam.

A circumference surface of the locking cam and an upper surface of the latch part may surface-contact each other.

The elastic part may include: a tooth spring applying the elastic force to the latch part so as to maintain a state in which the latch part is locked; and a cam spring applying the elastic force to the locking cam.

The lever and the locking cam may be connected to each other through a link coupled to the housing so as to be movable vertically.

[Detailed Description of Main Elements]

Figure 1:
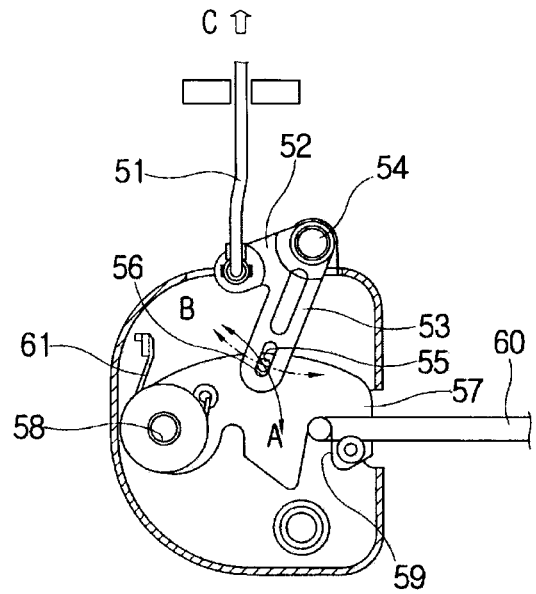
FIG. 1 is a view showing the seat back latch according to the prior art.

SBL: Seat back latch
100: Latch kit
110: Housing
110a: First housing
110b: Second housing
111: First fixing part
112: Second fixing part
113: Guide axis
115: Slit groove
116: Guide groove
117: Bending part
120: Latch part
121: First latching tooth
121a: First hinge hole
121b: First tooth
121c: First slit hole
122: Second latching tooth
122a: Second hinge hole
122b: Second tooth
122c: Second slit hole
122d: Guide Protrusion
123: First axis
123a: First groove
123b: Second groove
130: Locking part
131: Locking cam
131a: Third hinge hole
131b: Driving hole
132: Link
132a: Link hole
132b: Link slit hole
132c: Washer
132d: E ring
133: Second axis
133a: Third groove
134: Lever bracket
135: Lever
140: Elastic part
141: Tooth spring
142: Cam spring
200: Striker kit
210: Striker
220: Connection part
230: Fixing part

DETAILED DESCRIPTION OF EMBODIMENTS

Figure 2:
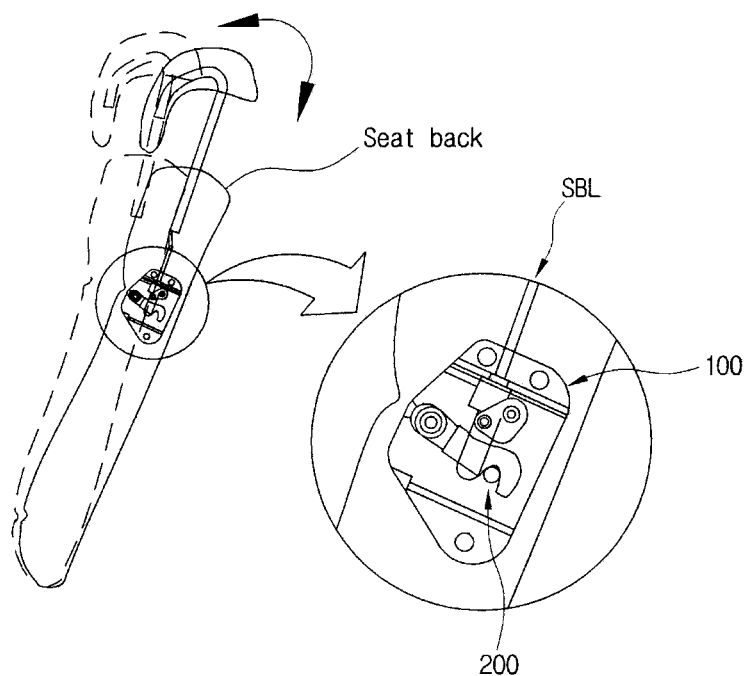
FIG. 2 is a side view of a seat back including a seat back latch according to an exemplary embodiment of the present invention.
Figure 3:
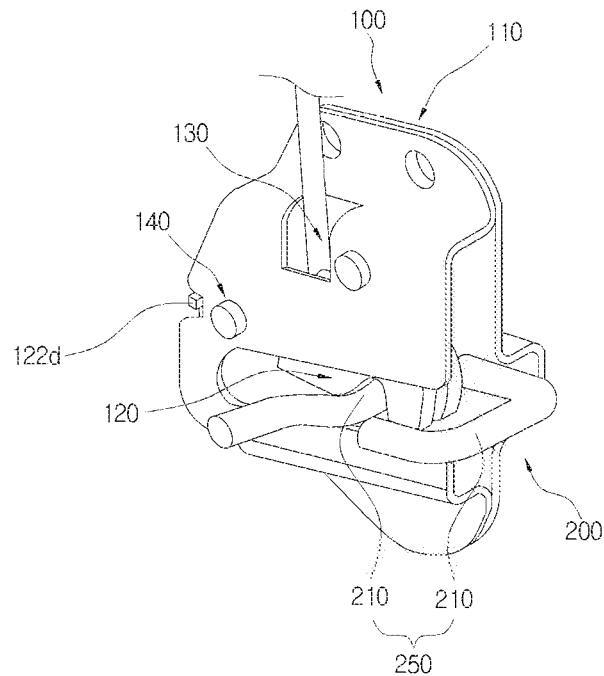
FIG. 3 is a perspective view of the seat back latch according to the exemplary embodiment of the present invention.
Figure 4:
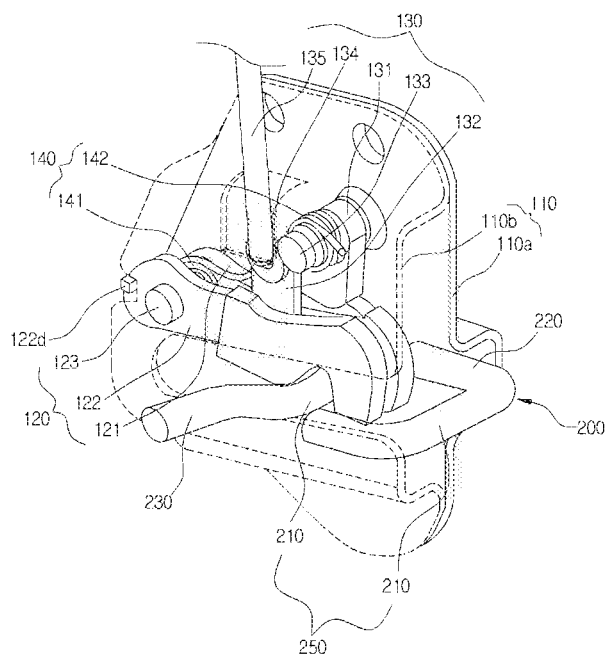
FIG. 4 is a perspective view showing an inner portion of the seat back latch according to the exemplary embodiment of the present invention.
Figure 5:
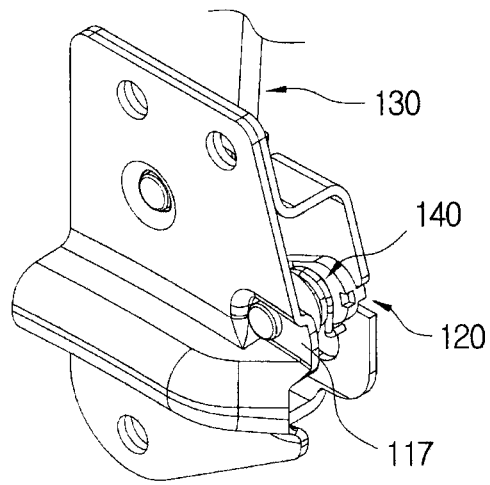
FIG. 5 is a perspective view showing a rear surface of the seat back latch according to the exemplary embodiment of the present invention.
Figure 6:
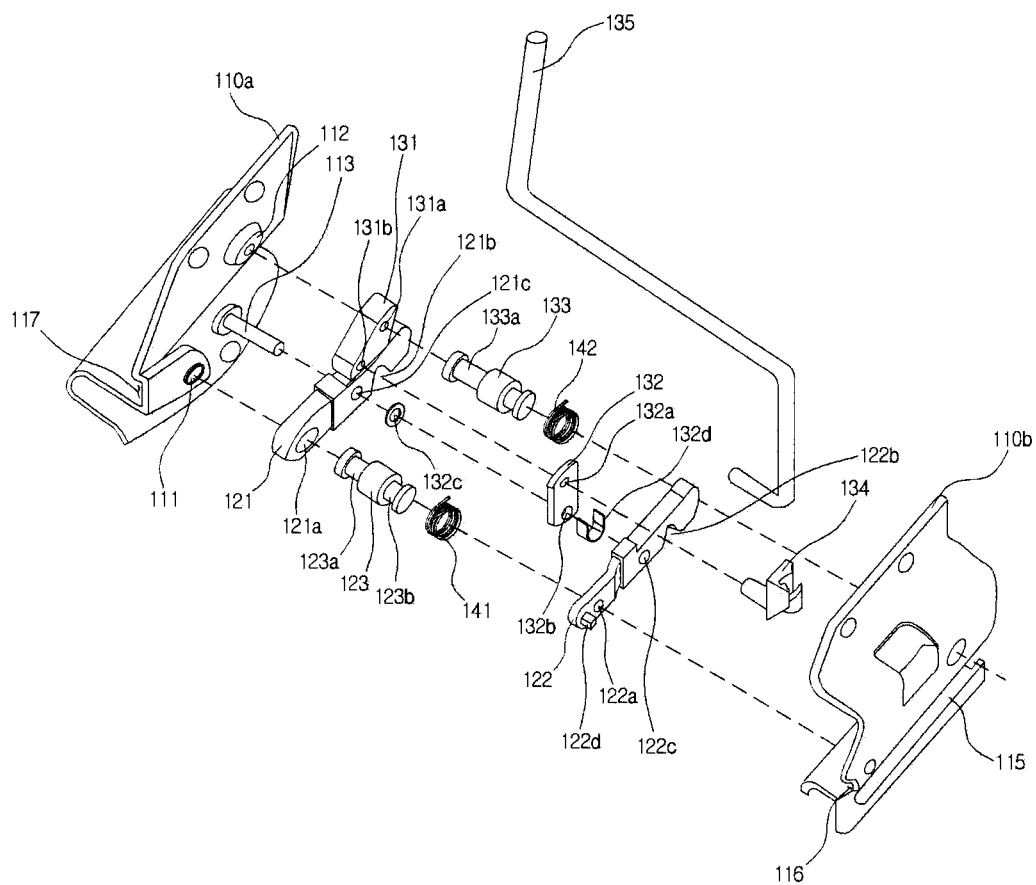
FIG. 6 is an exploded perspective view of a latch kit according to the exemplary embodiment of the present invention.

Referring to FIG. 2, a seat back latch (SBL) according to an exemplary embodiment of the present invention is configured to include a latch kit 100 installed at a side of a seat back and a striker kit 200 installed at a motor vehicle body of a portion adjacent to the side of the seat back, wherein the latch kit 100 is locked to or unlocked from each of a plurality of strikers spaced apart from each other by a predetermined distance to adjust an angle of the seat back and fold the seat back forward.

Hereinafter, the seat back latch (SBL) according to the exemplary embodiment of the present invention as described above will be described in detail with reference to the accompanying drawings.

Referring to FIGS. 3 to 6, the seat back latch (SBL) according to the exemplary embodiment of the present invention is largely divided into the latch kit 100 and the striker kit 200. The latch kit 100 may be installed at the side of the seat back and the striker kit 200 may be installed at an adjacent portion motor vehicle frame corresponding to the latch kit 100. Since detailed installation configurations of the latch kit 100 and the striker kit 200 correspond to a configuration of a general seat back latch, a detailed description thereof will be omitted.

The latch kit 100 is configured to include a housing 110, a latch part 120, a locking part 130, and an elastic part 140.

The housing 110 fixes the latch kit 100 to the seat back, receives components of the latch kit 100, and is formed of a bracket allowing an operation to be smoothly performed. The housing 110 includes a first housing 110a covering one side of the latch kit 100 and a second housing 110b covering the other side of the latch kit 100. The first housing 110a has one surface configured to contact the side of the seat back. The first housing 110a is provided with a first fixing part 111 to which a first axis 123 for hinge-rotating the latch part 120 is fixed. The first housing 110a may be provided with a bending part 117. The bending part 117 may be formed at a portion at which the first fixing part 111 is formed on the first housing 110a so as to be bent inwardly. The bending part 117 serves as a plate for stably fixing the first latching tooth 121 to the first fixing part 111 of the first housing 110a.

The first housing 110a is provided with a second fixing part 112 to which a second axis 133 for hinge-rotating the locking part 130 is fixed. The first housing 110a may include a guide axis 113 protruding from the other surface thereof in the other direction in order to guide the hinge-rotation of the latch part 120 to prevent separation of the latch part 120. Although the case in which the first and second axes 123 and 133 are formed separately from the first housing 110a is shown in the accompanying drawings, the first and second axes 123 and 133 may be formed integrally with the first housing 110a.

The second housing 110b may have one surface configured to contact the first housing 110a and include a slit groove 115 formed in a horizontal direction so that the striker kit 200 is slid. The slit groove 115 may be configured so that the other side of the second housing 110b in a width direction is opened and one side thereof is closed. The second housing 110b may include a guide groove 116 formed at one side thereof in the width direction, wherein the guide groove 116 may be formed at a portion corresponding to one end portion of the second latching tooth 122.

The latch part 120 is configured to include the first latching tooth 121, the second latching tooth 122, and the first axis 123.

The first axis 123 serves as a rotation center axis when the first and second latching teeth 121 and 122 rotate and also serves to fix a tooth spring 141 to be described below.

The first latching tooth 121 includes a first hinge hole 121a formed at one end portion thereof and a first tooth 121b formed at the other end portion thereof. Therefore, the first latching tooth 121 hinge-rotates around the first hinge hole 121a and the first tooth 121b moves vertically by the hinge-rotation. The first hinge hole 121a may be coupled to the first axis 123 so as to be hinge-rotatable.

The first tooth 121b may be configured to be engaged with the striker kit 200 and have a width that becomes smaller toward an upward direction so that it may be firmly fixed to the striker kit 200 when the first tooth 121b maintains a state in which it moves downwardly. The first latching tooth 121 may include a first slit hole 121c formed in a vertical length direction at the center thereof so that the guide axis 113 is fitted thereinto.

The second latching tooth 122 has one surface spaced apart from the other surface of the first latching tooth 121 so as to face the other surface of the first latching tooth 121.

The second latching tooth 122 includes a second hinge hole 122a formed at one end portion thereof and a second tooth 122b formed at the other end portion thereof. Therefore, the second latching tooth 122 hinge-rotates around the second hinge hole 122a and the second tooth 122b moves vertically by the hinge-rotation. The second hinge hole 122a may be coupled to the first axis 123 so as to be hinge-rotatable. The second tooth 122b may be configured to be engaged with the striker kit 200 and have a width that becomes smaller toward the upward direction so that it may be firmly fixed to the striker kit 200 when the second tooth 122b maintains a state in which it moves downwardly. The second latching tooth 122 may include a second slit hole 122c formed in the vertical length direction at the center thereof so that the guide axis 113 is fitted thereinto. The second latching tooth 122 includes a guide protrusion 122d formed at a portion corresponding to the guide groove 116 of the second housing 110b at one end portion thereof. The guide protrusion 122d is formed to protrude outwardly of the second housing 110b and is configured to contact the guide groove 116 at the time of rotation of the second latching tooth 122. Therefore, the guide protrusion 122d serves as a stopper limiting rotation of a predetermined distance or more at the time of the hinge-rotation of the second latching tooth 122.

In the case in which the latching tooth is configured of the first and second latching teeth 121 and 122 as described above, since force is further dispersed as compared to a single latching tooth, rigidity may be effectively maintained and horizontal movement of a seat back frame may be improved when the first and second teeth 121b and 122b are locked to the striker kit 200.

The first axis 123 has one end fixedly installed to the first fixing part 111. The first axis 123 includes first and second grooves 123a and 123b formed along a circumference of a side thereof, wherein the second groove 123b is spaced apart from the first groove 123a in the other end direction by a predetermined distance. The first groove 123a has the first hinge hole 121a fitted thereinto, and the second groove 123b has the second hinge hole 122a fitted thereinto.

The locking part 130 is configured to include a locking cam 131, a link 132, a second axis 133, a lever bracket 134, and a lever 135. The locking cam 131 has a triangular thick plate shape in which edges thereof are rounded. The locking cam 131 may include a third hinge hole 131a and a driving hole 131b formed therein. Therefore, the locking cam 131 hinge-rotates around the third hinge hole 131a and vertically moves the first latching tooth 121 by the hinge-rotation. More specifically, the driving hole 131b of the locking cam 131 is connected to a distal end of the lever 135 and a circumference surface of the locking cam 131 is configured to surface-contact an upper surface of the first latching tooth 121. In this case, since the lowermost portion of the locking cam 131 is displaced vertically at the time of rotation of the locking cam 131, the first latching tooth 121 contacting the circumference surface of the locking cam 131 moves vertically.

The link 132 is formed in the vertical length direction, has a plate shape, and includes a link hole 132a formed at an upper side thereof and a link slit hole 132b formed at a lower side thereof. The link 132 is positioned between the first and second latching teeth 121 and 122, and the link hole 132a is fitted into a distal end of the lever 135, such that the other surface thereof contacts the other surface of the locking cam 131. In addition, the link slit hole 132b is configured to be fitted into the guide axis 113. Therefore, the link 132 guides the rotation of the lever 135 to prevent separation of the lever 135 and prevents the locking cam 131 from rotating in a predetermined range or more. The link slit hole 132b may have a washer 132c fitted into one surface thereof and an E ring 132d fitted into the other surface thereof to fix the link 132.

The second axis 133 has one end fixedly installed to the second fixing part 112. The second axis 133 includes a third groove 133a formed along a circumference of a side thereof. The third groove 133a includes the third hinge hole 131a fitted thereinto. The lever 135 has one end exposed on the side of the seat back to serve to be applied with a load of a user and the other end connected to the like 132 and the locking cam 131 through the lever bracket 134 to serve to transfer the load of the user to the locking cam 131.

The elastic part 140 is configured to include a tooth spring 141 and a cam spring 142. The elastic part 140 may be a general torsion spring. The tooth spring 141 is fitted into the first axis 123 and is configured to apply elasticity in the other direction based on the first and second hinge holes 121a and 122a so as to maintain a state in which the first and second teeth 121b and 122b of the first and second latching teeth 121 and 122 move downwardly.

In addition, the cam spring 142 is fitted into the second axis 133 and is configured to apply elasticity to the locking cam 131 in one direction based on the third hinge hole 131a to maintain the state in which the first and second teeth 121b and 122b of the first and second latching teeth 121 and 122 move downwardly.

The striker kit 200 has a cylindrical shape. The striker kit 200 is configured to include a striker 210, a connection part 220, and a fixing part 230. The striker 210 is formed in a width direction of the latch kit 100 and is configured to be fitted into the first and second teeth 121b and 122b of the first and second latching teeth 121 and 122. A plurality of strikers 250 may be formed so as to be spaced apart from each other by a predetermined distance in the horizontal direction, Although the case in which the number of strikers 210 is two is shown in the accompanying drawings, the number of strikers 210 may also be two or more. The connection part 220 is configured to connect one sides of the plurality of strikers 250 to each other and the fixing part 230 connects the strikers 210 and a motor vehicle body bracket to each other.

Hereinafter, an operation of the seat back latch according to the exemplary embodiment of the present invention configured as described above will be described with reference to the accompanying drawings.

Figure 7:
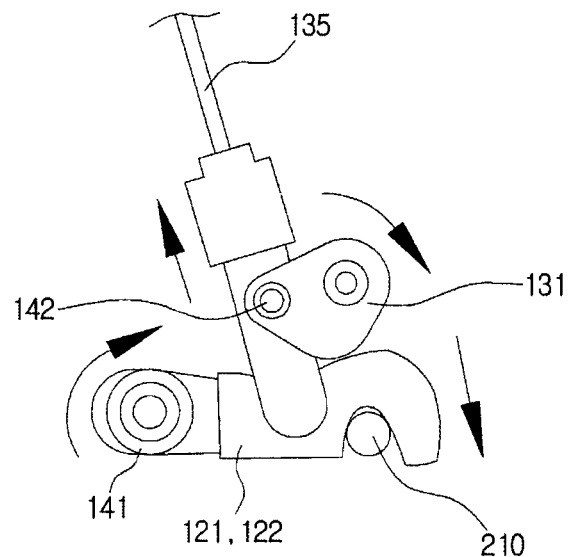
FIG. 7 is a view showing an operation state (locking) of the seat back latch according to the exemplary embodiment of the present invention.

Referring to FIG. 7, a locking mechanism according to the exemplary embodiment of the present invention is as follows.

When a load is not applied to the lever 135, the first and second latching teeth 121 and 122 rotate in a clockwise direction by the tooth spring 141 provided in the first axis 123 and the locking cam 131 rotates in a counterclockwise direction by the cam spring 142 provided in the second axis 133. Therefore, the first and second teeth 121b and 122b are maintained in a state in which they are locked to the striker 210. In this case, the lever 135 is maintained in a state in which it moves upwardly by the locking cam 131.

Figure 8:
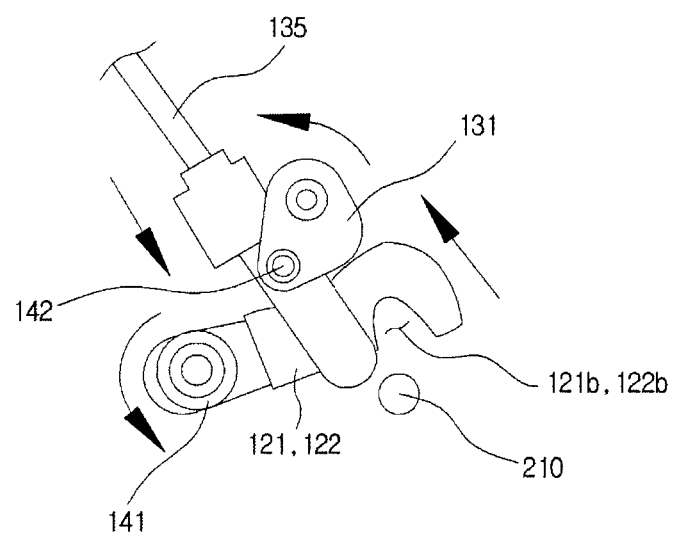
FIG. 8 is a view showing an operation state (unlocking) of the seat back latch according to the exemplary embodiment of the present invention.

Referring to FIG. 8, an unlocking mechanism according to the exemplary embodiment of the present invention is as follows.

When the load is applied downwardly to the lever 135, the locking cam 131 overcomes elasticity of the cam spring 142 provided in the second axis 133, such that it rotates in the clockwise direction. The locking cam 131 rotates in the clockwise direction, such that a lower end of the locking cam 131 is displaced downwardly and the first and second latching teeth 121 and 122 contacting a circumference surface of the locking cam 131 rotate in the counterclockwise direction. Therefore, the first and second teeth 121b and 122b move upwardly, such that they are maintained in a state in which they are unlocked from the striker 210.

Figure 9:
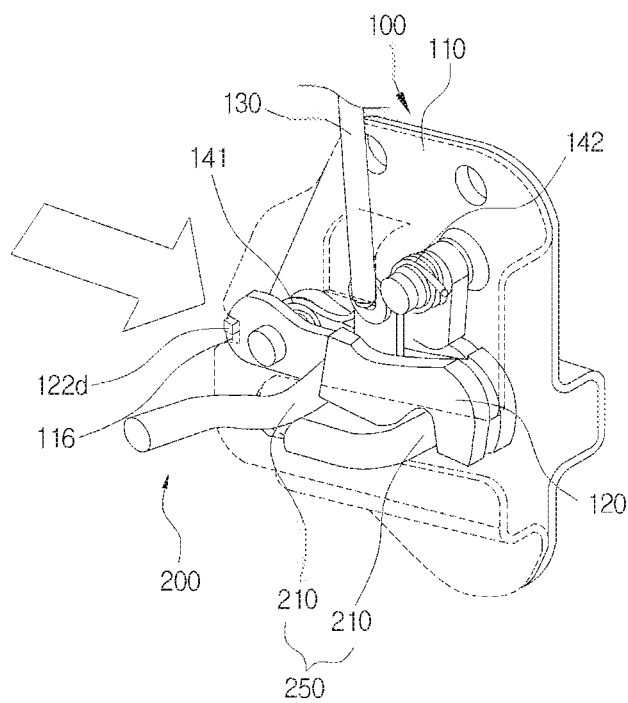
FIG. 9 is a view showing an operation state (inclination adjusting) of the seat back latch according to the exemplary embodiment of the present invention.

In addition, as shown in FIG. 9, the latch kit 100 is maintained in a state in which it is locked to each of the plurality of strikers 250, such that an inclination of the seat back is adjusted. FIG. 9 shows a state in which the latch kit 100 move from an initial position as shown in FIG, 3 in an arrow direction.

With the seat back latch according to the exemplary embodiment of the present invention having the configuration as described above, the inclination of the seat back is adjusted in a multi-stage and the power of the lever is transferred to the latch tooth through the surface-contact by the rotation of the locking cam, such that the seat back is certainly locked, thereby making it possible to firmly maintain a locked state.

In addition, an interval between the latch tooth and the striker is minimized, thereby making it possible to prevent vibration and noise of the seat back.

The present invention should not be construed to being limited to the above-mentioned exemplary embodiment. The present invention may be applied to various fields and may be variously modified by those skilled in the art without departing from the scope of the present invention claimed in the claims. Therefore, it is obvious to those skilled in the art that these alterations and modifications fall in the scope of the present invention.

What is claimed is:

1. A latch, comprising:
a striker kit adapted to be adjacent to a seat back in a motor vehicle; and
a latch kit adapted to be provided in the seat back and locked or unlocked relative to the striker kit,
wherein the latch kit includes:
a housing including a slit groove so that the striker kit is slid;
a latch part including a tooth exposed to the slit groove by downward movement to lock the striker kit;
an elastic part providing elastic force so as to maintain a state in which the latch part moves upwardly to maintain a state in which the tooth is unlocked from the striker kit; and
a locking part overcoming the elastic force of the elastic part by a lever to lock the tooth to the striker kit by the downward movement of the latch part, and
wherein the locking part includes a locking cam rotating by vertical movement of the lever, and a circumference surface of the locking cam and an upper surface of the latch part surface-contact each other so that the circumference surface of the locking cam directly pressurizes the upper surface of the latch part in the direction of the striker by the rotation of the locking cam.

2. The latch of claim 1, wherein the striker kit includes a plurality of strikers spaced apart from each other by a predetermined distance, and the latch is operable to adjust an inclination of the seat back when the latch part is locked to each of the plurality of strikers.

3. The latch of claim 1, wherein the elastic part includes:
a tooth spring applying the elastic force to the latch part so as to maintain a state in which the latch part is locked; and
a cam spring applying the elastic force to the locking cam.

4. The latch of claim 1, wherein the lever and the locking cam are connected to each other through a link coupled to the housing so as to be movable vertically.

* * * * *